United States Patent [19]

Usinger

[11] 4,248,451
[45] Feb. 3, 1981

[54] HITCH ASSEMBLY

[76] Inventor: Roger Usinger, 11311 S. Forest Ridge Rd., Oregon City, Oreg. 97045

[21] Appl. No.: 29,785

[22] Filed: Apr. 13, 1979

[51] Int. Cl.³ .............................................. B60D 1/06
[52] U.S. Cl. ........................... 280/490 R; 280/406 A; 280/446 B
[58] Field of Search .......... 280/490 R, 490 A, 406 A, 280/446 B, 482, 423 R, 511

[56] References Cited

U.S. PATENT DOCUMENTS

| 2,847,232 | 8/1958 | Graham | 280/490 R |
| 3,796,443 | 3/1974 | Crutchfield | 280/446 B |
| 3,889,978 | 6/1975 | Kann | 280/423 R |

Primary Examiner—John J. Love
Assistant Examiner—Donn McGiehan
Attorney, Agent, or Firm—Kolisch, Hartwell & Dickinson

[57] ABSTRACT

Hitch assembly for use in interconnecting a towing vehicle having a coupling element and a drawn vehicle includes a coupling having first and second components, one removably receivable within the other to permit preselected relative positioning therebetween, the first component being removably mountable on the coupling element of the towing vehicle and the second component being detachably connectable to the drawn vehicle. Securing together of the first and second components is provided by bolts after predetermined and fixed relative positions of the first and second components has been selected.

6 Claims, 4 Drawing Figures

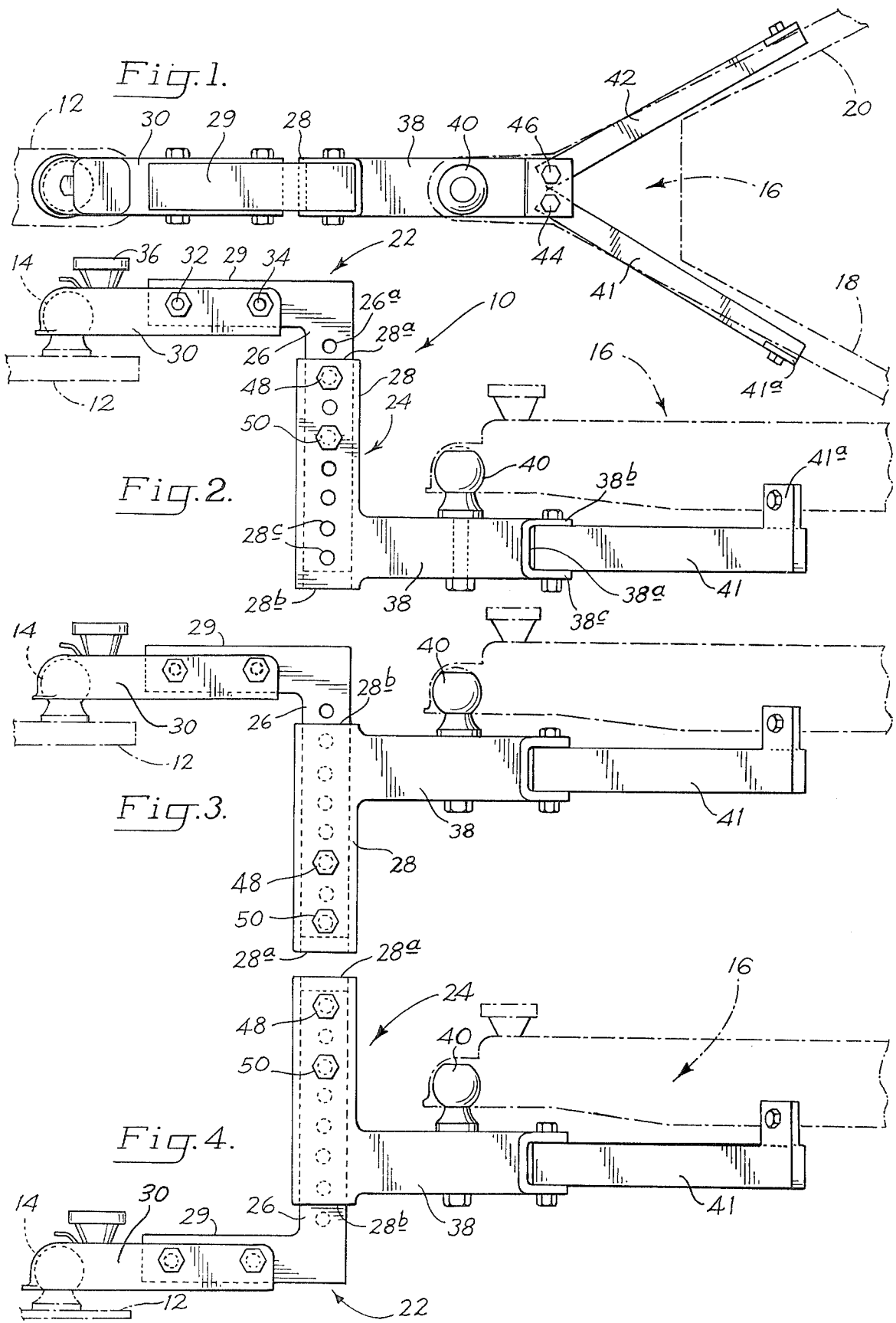

HITCH ASSEMBLY

BACKGROUND AND SUMMARY OF THE INVENTION

The present invention relates to trailer hitches and more particularly to a novel hitch assembly specially adapted for interconnecting a towing vehicle to a drawn vehicle irrespective of the vertical positioning of the tongue of the drawn vehicle, relative to the ground and irrespective of the bumper height of the towing vehicle.

It is conventional to interconnect a towing vehicle to a drawn vehicle by mounting a coupling element, such as a ball member on the bumper of the towing vehicle. The ball member is received within a socket provided on the draw bar of the drawn vehicle. However, as is often the case with off the road vehicles such as four-wheel drive pick-up trucks and the like, the bumper is considerably higher from the ground than the tongue height of a boat or house trailer, etc. Thus, if it is desired to interconnect the towing vehicle to the drawn vehicle with the tongue of the drawn vehicle being maintained substantially horizontally, it is necessary to provide some type of adapter unit secured on the towing vehicle.

Such adapters generally are large and heavy and require a multiplicity of struts or braces secured to the frame or chassis of the towing vehicle. It is necessary to suitably position the adapter unit, which generally includes a ball member, below the bumper and weld or bolt the braces to the chassis. Of course, it can be appreciated that if it is desired to tow a different vehicle, wherein the tongue height of the drawn vehicle is at a greater height than the adapter unit, such adapter unit is hardly functional. The limited use of large adapter units plus their attendant weight, high cost and the excessive time needed for installation make conventional adapter units undesirable. Certainly, it would be advantageous to provide a hitch assembly mountable on the ball member of a bumper for connection to the tongue of a drawn vehicle so that the tongue is maintained substantially horizontal, irrespective of the tongue height from the ground.

Accordingly, it is a general object of the present invention to provide a hitch assembly for interconnecting a towing vehicle and a drawn vehicle which includes a coupling means having hitch or first and second components, which are disassemblable, one being removably received within the other to permit preselected relative positioning therebetween. The first component is removeably mountable on a coupling element (such as a bumper-mounted ball member) of the towing vehicle and the second component is detachably connectable to the drawn vehicle. The first and second components are positionable, one relative to the other, in a selected one of a multiplicity of orientations. Such selected positioning is necessary to provide a hitch assembly which may be interchangeably used for interconnecting a towing vehicle with a drawn vehicle irrespective of bumper and tongue height.

A further object of the present invention is to provide a hitch assembly in which one of the components, preferrably that which is connected to the drawn vehicle, includes a tubular portion having opposed open ends. The other component is positionable through a selected one of the ends of the tubular portion for preselected positioning within the tubular portion. The result is a construction which serves to interconnect, by means of a "lowered step", a ball member mounted on a bumper which is higher than a desired horizontal positioning of the tongue of a drawn vehicle. In another orientation the tubular portion is rotated generally 180° and the insertable portion is positioned through the other end. In this manner, the ball member on the bumper, if disposed at substantially the same height as the tongue, will be aligned with the tongue.

Still another object of the present invention is to provide a hitch assembly, as described above, which may be used on a towing vehicle having a bumper height lower than the normally horizontal height of the tongue of the drawn vehicle. In this configuration, the components of the coupling means are suitably positioned to "step up" so as to provide an interconnection between the towing and drawn vehicle.

These and additional objects and advantages of the present invention will become more readily apparent after a consideration of the drawing and detail description of the preferred embodiment.

BRIEF DESCRIPTION OF THE DRAWINGS

FIG. 1 is a top plan view of a hitch assembly according to the present invention interconnecting a coupling element on a towing vehicle wih the tongue of a drawn vehicle, the tongue being at a lower height than the bumper of the towing vehicle;

FIG. 2 is a side elevation view of FIG. 1;

FIG. 3 is a side elevation view, similar to FIG. 2, illustrating repositioning of hitch components in another orientation to accommodate interconnection of the towing vehicle to the drawn vehicle where the bumper height of the towing vehicle is generally the same as the height of the tongue of the drawn vehicle; and FIG. 4 is a side view, similar to that shown in FIGS. 3 and 4 with repositioning of the hitch components to accommodate interconnection of the towing vehicle with the tongue of a drawn vehicle wherein the tongue height is greater than the bumper height.

DETAILED DESCRIPTION OF THE PREFERRED EMBODIMENT

As generally described above, it is an object of the present invention to provide a hitch assembly having hitch components which are selectively assemblable for interconnecting a towing vehicle to a drawn vehicle irrespective of the bumper height of the towing vehicle relative to the tongue height of the drawn vehicle.

With attention directed initially to FIGS. 1 and 2, description of a hitch assembly according to the present invention, generally indicated at 10, will be set forth with reference to interconnecting a towing vehicle having a bumper height higher, relative to the ground, than that of the tongue of a drawn vehicle. More specifically, a conventional bumper is diagrammatically indicated at 12 mounted on a towing vehicle. Bumper 12 is shown at some predetermined height above the ground and is provided with a conventional coupling element such as ball member 14. As can be seen, bumper 12 is shown located at a height somewhat greater than the height of a tongue, generally indicated at 16, of a drawn vehicle (not shown). Tongue 16 includes members 18, 20 joined in generally V-shaped manner at a forward end thereof, as is conventional.

Turning to the specific construction of hitch assembly 10, it can be seen that it includes a pair of disassemblable hitch components such as a first component generally indicated at 22 and a second component generally indicated at 24. One of the components, such as first component 22, is removably receivable within the other component such as second component 24. More particularly, it can be seen that first component 22 includes an insertable portion 26 which is slideably positionable within a tubular portion 28 of second component 24. Tubular portion 28 includes a pair of opposed open ends 28a, 28b, and insertable portion 26 has been positioned through end 28a. Extending generally perpendicularly to insertable portion 26 is a leg 29 which is secured to a socket member 30 having a channel portion for detachably receiving the leg. Socket member 30 is provided with apertures suitably alignable with apertures (not shown) in leg 29 for accommodating reception of securing bolts 32, 34. Socket member 30 is provided for suitable positioning over ball member 14, together with a locking device of conventional construction shown at 36.

With respect to second component 24, it can be seen that it includes an arm 38 extending generally perpendicularly from tubular portion 28 for providing a mounting for another coupling element such as ball member 40. As shown in FIG. 2, ball member 40 is suitably positioned at a predetermined location along arm 38 for being received within a conventional socket provided in tongue 16. Additionally, stabilizing or support means extending rearwardly from tubular portion 28 and arm 38 includes a pair of elongate members 41, 42. Elaborating further, it can be seen that elongate members 41, 42 are connectable to members 18, 20 respectively, of tongue 16 by means of flanges, such as flange 41a which receives a bolt therethrough secured to the tongue.

Further, it is to be noted that arm 38 is provided with an opening 38a at one end thereof for receiving an end of each of the elongate members. As can be seen from a consideration of FIG. 1, elongate members 41, 42 are pivotably connected to arm 38 for pivotal movement about a pair of associated vertical axes. The actual connection of elongate members 41, 42 is accomplished by inserting bolts, such as bolts 44, 46 through apertures provided in a pair of opposed lips 38b, 38c and through corresponding apertures provided in elongate members 41, 42 (not shown). It is necessary to provide such a pivotal connection because of the variations in the angle of generally V-shaped configuration of tongues on drawn vehicles.

Explaining now the securing of first component 22 to second component 24, it can be seen that a securing means is provided for predetermining and fixing the relative positions of the components and includes pin means and a plurality of apertures provided in insertable portion 26 alignable with apertures provided in tubular portion 28. Securing is effected by inserting pins or bolts through aligned ones of the apertures. For instance, a plurality of apertures one of which is shown at 26a are provided to extend through the width of insertable portion 26 at spaced-apart locations along its length. A plurality of apertures such as indicated at 28c are provided on opposite sides of tubular portion 28 at spaced-apart locations along its length. The apertures provided in insertable portion 26 are spaced-apart along their centers a distance substantially equal to the spacing of the apertures provided on tubular portion 28.

Thus, upon locating or positioning insertable portion 26 so that it is received within tubular portion 28, (as through end 28a) and securing the two portions together by means of pins, or bolts such as indicated at 48, 50, a rigid interconnected hitch assembly is provided.

Explaining the actual mounting or interconnection of hitch assembly 10 for interconnecting a towing vehicle and a drawn vehicle, it is necessary to first determine the relative heights of bumper 12 and tongue 16 with respect to the ground. Once this difference is determined, and assuming initial disassembly of first and second components 22, 24, insertable portion 26 may be suitably located within tubular portion 28 through open end 28a. Insertable portion 26 is then shifted relative to tubular portion 28 to a predetermined or preselected position which will enable ball member 40 to be received within the cavity 16 of tongue 16 with the tongue at a substantially horizontal elevation. Next, assuming that socket 30 is secured to leg 29 with the socket member mounted over ball member 14, elongate members 41, 42 are swung into position adjacent tongue members 18, 20 for connection thereto. This is all done while tongue 16 is suitably supported above the ground by means of a vertically adjustable and ground engaging pedestal of conventional construction (not shown). With elongate members 41, 42 secured to tongue 16, the pedestal support may be retracted and the towing vehicle and drawn vehicle are thereby interconnected. Of course, variations in this actual assembly procedure may be varied.

What has been described above is a hitch assembly having a pair of generally L-shaped components, one slideably received within the other, so that they may be selectively positioned relative to one another to "step up" or "step down" to accommodate towing and drawn vehicles having bumper and tongue heights of different elevations, in this instance the bumper being located at a greater height than the tongue. However, it is to be specifically noted that the provision of opposed open ends 28a, 28b provide further noteworthy advantages.

For instance, as shown in FIG. 3, suitable repositioning of the first and second components, from the first orientation, described above, will enable interconnection of towing and drawn vehicles wherein the bumper and tongue heights are approximately equal. Explaining further, it can be seen that tubular portion 28 has been removed, from the assemblage shown in FIG. 2, and positioned so that insertable portion 26 is positioned through open end 28b to a preselected position in another or second orientation. Additionally, it is to be noted that ball member 40 has been removed from its position on arm 38 (as in FIG. 2) and mounted on the opposite side of the arm as shown in FIG. 3. Pins 48, 50 are inserted through corresponding aligned apertures, in the manner shown in FIG. 3, to fix the relative positions of first and second components 22, 24 respectively. Thus, it can be seen that by disassembling the first and second components, from the assembly shown in FIG. 2, and by rotating second component 24 approximately 180° and inserting first component 22 into the other end of second component 24, the assembly of FIG. 3 is provided.

Considering FIG. 4, still another orientation of the first and second components is shown. With respect to this orientation, it is desired to interconnect a towing vehicle with a drawn vehicle in the situation wherein the bumper and coupling is at a lower height, relative to the ground, than the tongue of the drawn vehicle. To accommodate this situation, it is assumed that first component 22 is disassembled from second component 24. Additionally, first component 22 must be removed from its positioning relative to socket member 30 as shown in FIG. 1 rotated 180° and mounted as shown in FIG. 4 with insertable portion 26 positioned upright as indicated. Next, second component 24 with ball member 40 mounted as shown in FIG. 4 is inserted over insertable portion 26 with the insertable portion being positioned through open end 28b to some predetermined location. Pins 48, 50 are then inserted through corresponding, aligned apertures for fixing the relative positions of first and second components 22, 24. Elongate members 41, 42 have been removed and rotated for suitable connection to tongue 16. Of course, it is a relatively simple matter to remove pins 48, 50 and shift or "step up" second component 24 relative to first component 22 should tongue 16 be at another height, relative to bumper 12 than that shown in FIG. 4.

To briefly summarize, it can be seen that hitch assembly 10 of the present invention incorporates a pair of hitch components, such as first and second components 22, 24 respectively which are assemblable in a selected one of a multiplicity of orientations. This is achieved by forming each of the first and second components as a generally L-shaped component and making one slideably receivable within the other through opposed open ends. Thus, by suitably inserting one of the components through a selected end of a tubular portion of the other component, various height adjustments in "stepping up" or "stepping down" may be achieved to accommodate towing and drawn vehicle connection, irrespective of bumper and tongue heights.

One of the primary advantages of the construction, as described above, resides in the fact that large and bulky permanent hitch assemblies need not be secured to the chassis of a recreational vehicle, such as a four-wheel drive vehicle, in order to interconnect the vehicle to a drawn vehicle. In addition, the hitch assembly of the present invention is adapted for ready use with other towing and drawn vehicles. All that is required is that the first and second components be repositioned, as by selective shifting or by rotating one or both of the components prior to reinsertion.

While the present invention has been particularly shown and described with reference to the foregoing preferred embodiment, it will be understood by those skilled in the art that other changes in form and detail may be made without departing from the spirit scope of the invention as defined in dependent claims.

It is claimed and desired to secure by Letters Patents:

1. Hitch assembly for use in interconnecting a towing vehicle having a ball member coupling element and a drawn vehicle comprising:
   a socket member for removable mounting on said ball member coupling element, said socket member including a channel portion extending therefrom;
   coupling means including first and second components, said second component including a tubular portion having opposed open ends and an arm extending generally perpendicularly therefrom for detachable connection to the drawn vehicle, said first component including an insertable portion for positioning within said tubular portion through a selected one of said ends for preselected positioning within said tubular portion, said first component also including a leg extending generally perpendicularly therefrom for detachable mounting within said channel portion of said socket member so that said leg may be rotated and selectively positioned in said channel portion for disposing said insertable portion substantially upright or downwardly; and
   securing means for predetermining and fixing the relative position of said first and second components.

2. The hitch assembly of claim 1 wherein said securing means includes pin means and a plurality of apertures provided in said tubular portion and said insertable portion, said apertures being selectively alignable upon suitable positioning of said portions, said pin means being locatable through corresponding aligned apertures for fixing said portions relative to one another.

3. The hitch assembly of claim 1 further including support means extending rearwardly from said tubular portion detachably connectable to the drawn vehicle for maintaining said tubular and insertable portions substantially upright.

4. The hitch assembly of claim 4 wherein said support means includes an elongate member pivotally connected to said tubular portion.

5. The hitch assembly of claim 4 wherein said elongate member is pivotal about a substantially vertical axis.

6. The hitch assembly of claim 3 wherein said support means includes a pair of elongate members, each being pivotally connected to said tubular portion for pivoting, prior to connection to the drawn vehicle, about separate, substantially vertical axes.

* * * * *